United States Patent [19]

Ealey et al.

[11] Patent Number: 5,037,190
[45] Date of Patent: Aug. 6, 1991

[54] FUSIBLE LINK ACTUATORS FOR DEFORMABLE MIRRORS

[75] Inventors: Mark A. Ealey, Ayer; John A. Wellman, Lowell, both of Mass.

[73] Assignee: Litton Systems, Inc., Lexington, Mass.

[21] Appl. No.: 558,915

[22] Filed: Jul. 27, 1990

[51] Int. Cl.⁵ ............................................. G02B 7/18
[52] U.S. Cl. ..................................... 350/610; 359/849
[58] Field of Search ................ 350/607, 609, 620, 621

[56] References Cited

U.S. PATENT DOCUMENTS

| | | | |
|---|---|---|---|
| 4,657,358 | 4/1987 | Anthony et al. | 350/610 |
| 4,906,087 | 3/1990 | Ealey et al. | 350/611 |
| 4,934,803 | 6/1990 | Ealey | 350/607 |
| 4,940,318 | 7/1990 | Ealey et al. | 350/611 |

Primary Examiner—Rodney B. Bovernick
Assistant Examiner—J. P. Ryan
Attorney, Agent, or Firm—Michael H. Wallach; Robert F. Rotella

[57] ABSTRACT

A construction for a deformable mirror is disclosed in which each of the electrodistortive actuators used to selectively impart deformations to the mirror's reflecting facesheet are mechanically fastened to the facesheet and may be disengaged from the facesheet by operating a fusible link. In one preferred embodiment the fusible link consists of a layer of thermoplastic material covering an electrical resistive element located between the top of the actuator and the point on the facesheet at which the actuator is mechanically bonded to the facesheet. Heat generated by the resistive element may be used to melt the thermoplastic material fastening the actuator to the facesheet. The second preferred embodiment provides a fusible link consisting of an electrocapacitive layer sandwiched between two electrically-conducting layers. When an electrical signal is applied to the two chemical conducting layers, the electrocapacitive layer is mechanically severed from the actuator, thereby permitting the actuator to be removed from contact with the facesheet.

19 Claims, 2 Drawing Sheets

FUSIBLE LINK ACTUATORS FOR DEFORMABLE MIRRORS

BACKGROUND OF THE INVENTION

1. Field of the Invention

This invention relates to deformable mirrors in general, and more particularly to deformable mirrors having actuators for deforming the mirrors reflecting surface which may be replaced without requiring disassembly of the entire mirror structure.

2. Summary of the Prior Art

Deformable mirrors are useful for correcting distortions introduced into optical signals by passage of the optical signal through a distorting medium, e.g. the transmission of the optical signal through the Earth's atmosphere. A class of deformable mirrors has been developed with a cooled reflecting surface which permits the use of the deformable mirror for reflecting high energy signals, for example high energy laser signals, or for uses in which the reflecting surface must be cooled to avoid the introduction of thermally-induced distortion into the reflected signal. For a brief introduction into the use of deformable mirrors for controlling optical wavefronts, see the article by J. F. Reintjes appearing the Dec., 1988 issue of *Laser Focus/Electro-Optics* magazine entitle, ("Nonlinear and Adaptive Techniques Control Laser Wavefronts"). An example of a cooled deformable mirror which may be used for controlling the wavefront of a laser signal is disclosed in U.S. Pat. No. 4,657,358. Deformable mirrors such as that disclosed in the foregoing patent utilize a plurality of actuators, for example piezoelectric actuators, whose length may be independently controlled by the selective application of an electrical signal thereto to selectively deform areas of the mirrors reflecting surface to correct known anomalies contained in an impinging optical signal's wavefront, or to introduce desired distortions into a wavefront.

Cooled deformable mirrors of the type disclosed in the foregoing patent suffer from the defect of having their actuators permanently bonded between the mirror's reflecting facesheet and the base or coolant manifold supporting the facesheet. As in the case of the deformable mirror disclosed in the foregoing patent, the actuators may be used as channels to direct coolant toward and away from the mirror's facesheet, thus also providing the ancillary benefit of cooling the actuator with the circulating coolant, as well as cooling the mirror's facesheet. A deficiency of the foregoing construction, however, is that individual actuators may not be easily removed from the deformable mirror to facilitate replacement of failed or damaged actuators. Consequently, the failure of one or more actuators in the deformable mirror results in a tedious, time-consuming process being required to completely disassemble the deformable mirror to remove the failed actuator and replace it with a new actuator.

U.S. Pat. application Ser. No. 266,616, filed Nov. 3, 1988, now U.S. Pat. No. 4,940,318 discloses a construction for a a deformable mirror having actuators which are threaded into the base of the deformable mirror to permit the actuators to be readily removed from the deformable mirror to facilitate both construction of the mirror and replacement of actuators that fail. However, the foregoing mirror does not provide for cooling of the base manifold, the mirror's faceplate or the actuators. In addition, because the actuators are not directly mechanically fastened to the mirror's facesheet, the deformable mirror must rely on the use of a gradient membrane to retract the facesheet of the deformable mirror to insure mechanical linkage between the actuators and the mirror's reflecting surface. Such a mechanical retraction mechanism can suffer from high cycle fatigue, mechanical hysteresis, and non-linear force response. Consequently, there is a need for an arrangement to permit actuators to be used to channel coolant between a base manifold and a deformable mirror's reflecting facesheet while permitting the actuators to be readily removed from the deformable mirror to facilitate servicing of the deformable mirror. This need is particularly prevalent in deformable mirrors having several hundred actuators, where the laws of probability and statistics dictate that many actuators may ultimately fail, consequently preventing accurate control of the mirror's reflecting facesheet, and therefore rendering as suspect the ability of the deformable mirror to accurately control or introduce distortions into an optical wavefront.

SUMMARY OF THE INVENTION

Accordingly, a principal object of the present invention is to provide a construction for a deformable mirror in which the actuators used to control deformations in the mirror's reflecting surface may be easily replaced.

Another object of the invention is to provide a deformable mirror in which the replaceable actuators are adapted to carry fluid toward and away from a manifold in the mirror's reflecting facesheet, to facilitate cooling of the actuators.

Still another object is to provide a construction for a deformable mirror in which replacement actuators may be easily installed in the mirror while retaining the feature of having replacement actuators themselves be easily removed from the deformable mirror at a subsequent time.

The above and other objects and advantages of the invention are achieved by utilizing actuators having fusible links at the end of the actuator fastened to the deformable mirror's reflecting facesheet. Each actuator is supported on a removable plug having a threaded body which is received in a threaded aperture in the body of the deformable mirror. Each actuator contains an aperture passing through the length of the actuator's body which permits cooling fluid to be circulated between a manifold in the reflecting facesheet and the base of the deformable mirror. In the preferred embodiment disclosed herein, each actuator is composed of stacks of electrodistortive material, such as lead magnesium niobate (PMN), which are interleaved with electrodes. The electrodes are connected through a control system to a source of power to permit the application of a voltage across the layers of electrodistortive material.

The end of each actuator which abuts against the facesheet of the mirror contains a fusible link to permit selective detachment of the actuator from the facesheet. Each actuator is bonded to the facesheet by use of epoxy or other structural adhesive, or a thermoplastic material which will permit a strong mechanical bond between the end of the actuator containing the fusible link and the facesheet of the deformable mirror, while still permitting fluid to flow through the actuator and into the manifold in the facesheet through an orifice in the material forming the mechanical bond between the facesheet and the actuator. The two preferred embodiments disclosed herein show that the fusible link may consist of either an electrically resistive heating element contained in a thermoplastic adhesive or a capacitive fuse consisting of two or more layers of electrically-conducting material, on either side of one or more intervening layers of electroceramic material, for example lead magnesium niobate, contained therebetween. The fusible link is connected to an electrical power supply. When it is desired to release one or more of the actuators from the facesheet, appropriate electrical connections are completed between the electrical power supply and the appropriate fusible links to be actuated to permit the actuators desired to be removed to be mechanically separated from the facesheet by either melting the thermoplastic adhesive in the fusible link or by the physical rupture of the layers of electroceramic material contained between the electrically-conducting layers due to the shear stress which develops at the ceramic/electrode interface. Thereafter, the disconnected actuator may be unthreaded from the aperture in the base of the mirror and removed from the deformable mirror. A replacement actuator may be installed by first coating the end intended to be mechanically bonded to the facesheet with a thermoplastic adhesive material if a fusible link having a heating element is used, or with epoxy if a capacitive-type fusible link is used. Thereafter, the actuator is screwed into the aperture and the fusible link end of the actuator is mechanically contacted with the facesheet and the adhesive material (or epoxy) is allowed to dry to form a mechanical bond between the actuator and the facesheet. The electrical contacts for the fusible link are then connected to the power supply for the fusible link, thereby restoring the ability of the deformable mirror to have the installed actuator subsequently removed for repair or replacement, if necessary.

BRIEF DESCRIPTION OF THE DRAWINGS

The above objects and other advantages of the invention will be appreciated after a review of the detailed description of a preferred embodiment when read in conjunction with the drawing in which.

DETAILED DESCRIPTION OF A PREFERRED EMBODIMENT

Figure 1:
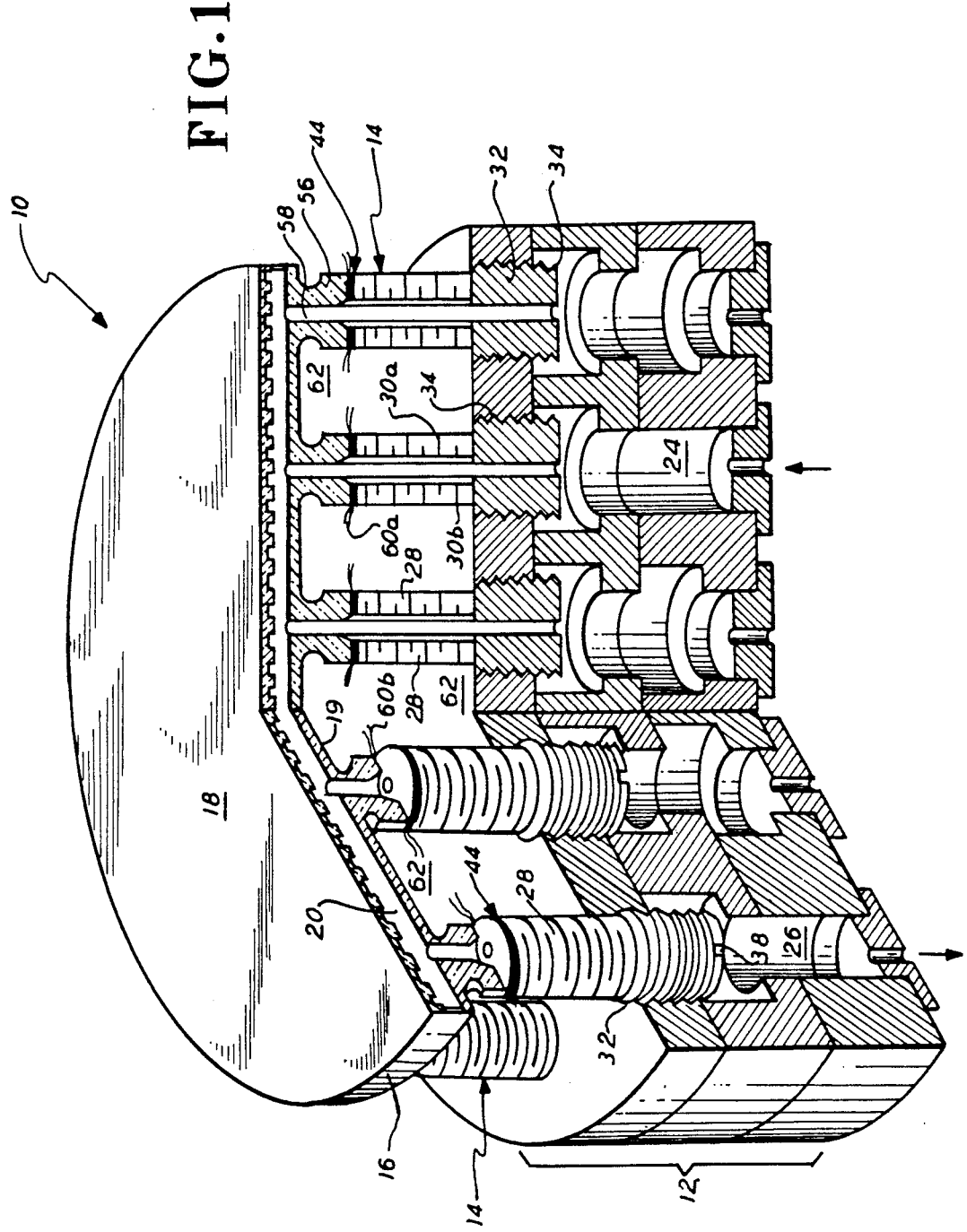
FIG. 1 is a perspective side view partially in section showing a deformable mirror having actuators containing fusible links constructed in accordance with the disclosed invention.

Referring to the drawing, FIG. 1 shows a deformable mirror 10 having actuators constructed in accordance with the teachings of the invention. The mirror 10 includes a base manifold 12 preferably manufactured from a material having a low coefficient of thermal expansion, for example from silicon or from Invar. Supported above the base 12 by a plurality of actuators, each of which is shown generally at 14, is a facesheet 16 having a reflecting surface 18 on the front side thereof, and a rear surface 19. Preferably the facesheet 16 is manufactured from a material having a low coefficient of thermal expansion, for example from ultra low expansion (ULE) glass or silicon, which may be easily polished and/or coated with a reflecting finish. Preferably the facesheet includes a manifold arrangement having one or more chambers 20, such as the facesheet disclosed in U.S. Pat. No. 4,657,358 which issued on Apr. 14, 1987, which is owned by the owners of the present invention and the teachings of which are incorporated herein by reference. The base 12 preferably includes a manifold consisting of inlet chambers 24 and outlet chambers 26 which may be used to circulate coolant toward and away from the facesheet 16.

Figure 2:
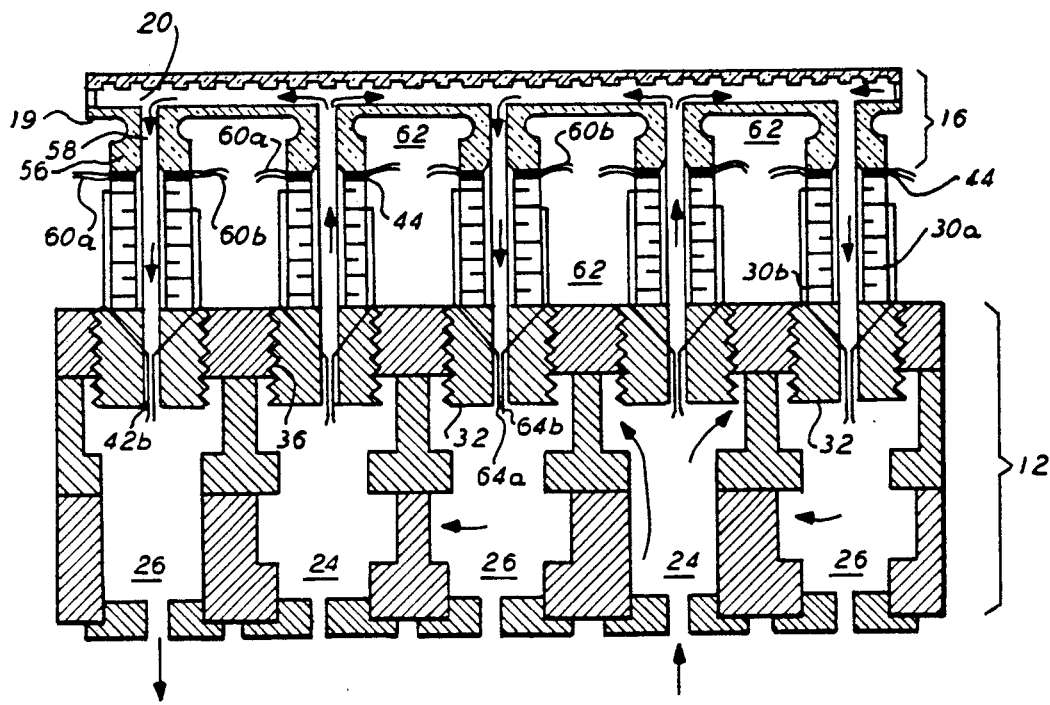
FIG. 2 is a side view in section showing the deformable mirror of FIG. 1.

FIG. 2 best illustrates that in a preferred embodiment coolant is circulated toward and away from the facesheet 16 by passing through each actuator 14. Each actuator 14 consists of a plurality of layers 28 of electrodistortive material, for example lead magnesium niobate, interleaved between alternating layers of electrical contacts, for example layers 30a and 30b, to permit electrical signals to be applied between each of the layers 28. As is well known in the art, when electrical signals are applied to the layers 30a and 30b, the electrodistortive material elongates, causing the actuator 14 to be forced up against the facesheet 16, thereby introducing a distortion into the reflecting surface 18. Each actuator 14 is supported on a threaded plug 32 having a series of fine threads 34 at its lower end to engage the threaded apertures 36 in the base of the mirror. Preferably, each aperture 36 contains a threaded portion to receive the threaded end 34 of the threaded plug 32. The threaded plug 32 also contains a slot 38 at its lower end to receive a tool to permit rotation of the plug 32 within the aperture 36. The upper end of each plug 32 contains a depression 40 in which the body of the actuator 14 is received. Each plug 32 and actuator 14 contain aligned apertures 42a and 42b to permit the circulation of a coolant fluid between a manifold such as that shown in the aforementioned U.S. Pat. No. 4,675,358 in the base 12 and the facesheet 16.

Figure 3:
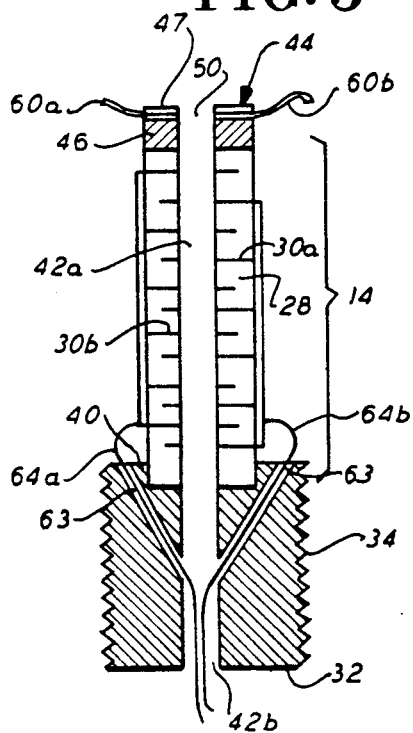
FIG. 3 is an enlarged view showing the details of an actuator.
Figure 4:
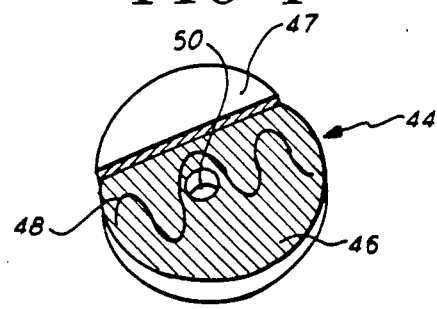
FIG. 4 is a perspective view of a resistive fusible link suitable for use in the disclosed invention.
Figure 5:
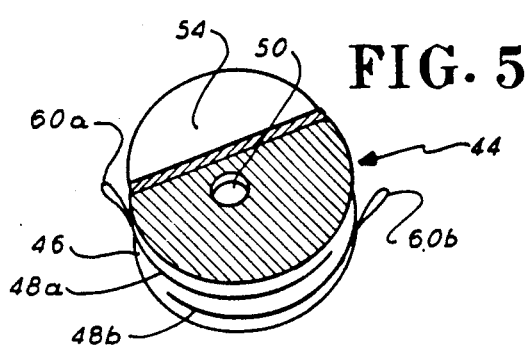
FIG. 5 shows a capacitive fusible link.

The top end of each actuator 14 has fitted thereto a fusible link shown generally at 44. The fusible link 44 is comprised of a body 46 and an electrical element 48 contained therein. In one preferred embodiment shown in FIGS. 3 and 4, the body 46 has a layer of thermoplastic adhesive 47 on its top and the electrical element 48 consists of an electrical resistive heating electrical element 48 consists of an electrical resistive heating element. In another preferred embodiment shown in FIG. 5, the body 46 consists of one or more layers of electroceramic material for example thin layers of lead magnesium niobate, and the electrical element 48 consists of electrically conductive layers 48a and 48b. Preferably the body portion 46 of each fusible link 44 contains a coolant aperture 50 which is aligned with the coolant passage 42a in the body of the actuator 14 and ports contained in the coolant chamber 20 of the facesheet 16, to permit coolant to circulate between the manifold in the base 12 of the mirror and the coolant chamber 20 in the mirror's facesheet. Each actuator 14 is mechanically fastened to the facesheet 16. Fusible links manufactured from electroceramic material utilize a layer 54 of epoxy or adhesive compound contained between the top of the fusible link 44 and pusher pads 56 to bond each fusible link 44 to a pusher pad 56. Fusible links 44 which utilize a heating element 48 may use the layer 47 of heat-sensitive thermoplastic material to effect the necessary bond. The material used to form the bond between the fusible link and the pusher pads 56 must be sufficiently strong to permit the actuator to pull down on the facesheet 16 to retract the facesheet 16 thereby producing a "dimple" in the reflecting surface 18 of the facesheet 16, while still maintaining a fluid-tight connection between a channel 58 in the pusher pad 56 and the channel 50 passing through the fusible link. Each fusible link 44 contains a pair of electrical contacts 60a and 60b to permit the application of an electrical signal to the electrical element 48 contained in each fusible link 44. The electrical contacts 60a and 60b are connected to electrical circuits through wires (not shown) which are threaded through the open chamber 62 located in the deformable mirror between the bottom surface of the facesheet 16 and the top of the base 12. Preferably, each pair of electrical contacts 60a and 60b are separately controlled to permit each individual fusible link 44 to be actuated without affecting the contact between any other fusible link 44 and the mirror facesheet 16. Each of the threaded plugs 32 contains a pair of apertures 63 to permit electrical contacts 64a and 64b from the alternating layers of electrodes 30a and 30b to be connected to control electronics (not shown) to control elongation of the actuators 14 in a manner well known in the art.

During construction of the deformable mirror, actuators 14 are inserted into the base 12 of the deformable mirror by threading each threaded plug 32 into an aperture 36. The actuators are aligned to assure that each actuator is of a uniform height above the base, using an alignment tool inserted in slot 38, for example a system similar to that disclosed in U.S. Pat. No. 4,923,302 which issued on May 8, 1990 and which is owned by the owner of the present invention, and incorporated herein by reference. After alignment, the electrical contacts 60a and 60b are electrically connected to a source of electricity which may be selectively operated to activate specific ones of the fusible links 44 when desired. Thereafter, a uniform layer of thermoplastic adhesive (for fusible links having a heating element 48) or epoxy 54 is applied to the top of each fusible link 44 and the facesheet 16 contacted to each actuator by the pads 56. During the foregoing process, care is taken to insure that the aperture 50 in each fusible link remain in fluid-contact with the aperture 58 in each pad 56 and does not become clogged with adhesive, and that a uniform fluid-retaining seal is formed between the fusible link 44 and each pusher pad 56. The electrical leads 64a and 64b may thereafter be connected through a fluid impervious connector (not shown) in the base 12 of the faceplate to control electronics (not shown) for controlling deformations imparted to the reflecting surface 18 of the facesheet 16.

When it becomes necessary to remove an actuator 14 due to failure of the actuator 14 to operate properly, an electrical signal is applied to appropriate ones of the leads 60a and 60b to sever the mechanical contact between the actuator 14 and the pusher pad 56. In the case of an resistive fusible link, the applied electrical signal heats up the thermoplastic adhesive of the body 46, causing the adhesive layer 47 to melt and permits the actuator to be unthreaded from the aperture 36 in the base 12. In the case of a capacitive fusible link 44, the application of a signal to terminals 48a and 48b cause the electroceramic material between the electrodes to rupture, thereby mechanically permitting the actuator 14 to be mechanically separated from the facesheet 16.

A new actuator 14 may be installed in an fully-assembled mirror by coating the top surface of the fusible link 44 attached to the top of a new or repaired actuator 14 with a slow-drying epoxy or adhesive compound to form a layer 47, being sure that the epoxy or adhesive material is kept from clogging coolant passage 50. Thereafter, the actuator 14 is threaded via its plug 32 into the base 12 through the aperture 36 until it lightly contacts the pad 56. The adhesive or epoxy layer 47 is allowed to dry before leads 60a and 60b are reconnected to a supply of electrical power.

While the fusible link described herein has been described when used in connection with a cooled deformable mirror in which coolant circulates through the actuators, it must be appreciated that the invention has utility for use with actuators which are not cooled, i.e., those actuators in which coolant does not circulate through the body thereof. It is intended that all such other embodiments of the invention be covered within the scope of coverage of the this patent, and that the breadth of coverage afforded by the patent be only limited by the permissible scope of interpretation of the claims.

We claim:
1. An actuator for use in a cooled deformable mirror having a base and a facesheet containing a defromable reflecting surface supported above said base, by a plurality of said actuators, each of said actuators being comprised of:
   a. a plurality of layers of electrodistortive material for selectively producing an elongation of said actuators;
   b. means for supplying an electrical signal between said layers of electrodistortive material; and
   c. a fusible link at the end of each actuator which contacts said facesheet, each of said fusible links capable of being selectively electrically energized to mechanically disconnect one or more of said actuators from said facesheet.

2. The actuator of claim 1 wherein said fusible link is comprised of a resistive electrical heating element being at least partially covered by a thermoplastic adhesive film.

3. The actuator of claim 1 wherein said fusible link is comprised of a layer of electroceramic material sandwiched between an upper and a lower electrically-conducting layer.

4. The actuator of claim 3 wherein each of said actuators is mechanically bonded to said facesheet by an epoxy adhesive.

5. The actuator of claim 1 further including a coolant channel passing through said layers of electrodistortive material, and through said fusible link to permit a coolant to flow between said base and said facesheet.

6. The actuator of claim 5 wherein said base contains a first chamber for receiving coolant to be transported toward said facesheet and a second chamber in which coolant is received after being circulated through said facesheet, with the coolant channels of one or more of said actuators connected to said first chamber and the coolant channels of one or more other of said actuators connected to said second chamber to permit coolant to be transported between said facesheet and said base.

7. The actuator of claim 1 wherein each actuator is supported in said base by a threaded plug received in a threaded aperture in said base.

8. A fusible link to permit an electrodistortive actuator to be mechanically separated from the facesheet of a deformable mirror, said fusible link consisting of a body bonded to the top of said actuator and to the bottom side of said facesheet, and an electrical element in contact with the body of said fusible link.

9. The fusible link of claim 8 wherein said electrical element is a resistive element for heating the body of said fusible link.

10. The fusible link of claim 9 wherein said electrical element is buried in a layer of thermoplastic adhesive.

11. The fusible link of claim 9 wherein said electrical element surrounds the body of said fusible link.

12. The fusible link of claim 8 wherein the body of said fusible link is substantially comprised of a thermosetting plastic.

13. The fusible link of claim 8 wherein the body of said fusible link is comprised of a layer of electroceramic material and said electrical element is comprised of two or more electrically-conducting layers disposed above and below said layer of electroceramic material, the body of said fusible link being fastened to the facesheet and to the actuator with a permanent adhesive bond.

14. In a cooled deformable mirror having a base and a thin, deformable facesheet supported above said base, a plurality of actuators supporting said facesheet above said base, each of said actuators being selectively operable to impart a controlled deformation into said facesheet, said facesheet containing at least one enclosed chamber for receiving a cooling fluid and said base containing a first chamber for supplying cooling fluid to be circulated toward said facesheet and a second chamber for receiving cooling fluid after it has been circulated through said facesheet, at least two or more of said actuators having coolant passages passing through the length of each of said actuators for channeling coolant between the first chamber in said base and the enclosed chamber in said facesheet and from the enclosed chamber in said facesheet to the second chamber in said base, each of said actuators being rigidly fastened to said base and to said facesheet, the improvement comprising mechanically fastening each of said actuators to said facesheet and to said base with a fusible link which may be selectively actuated to detach one or more of said actuators from said facesheet.

15. The cooled deformable mirror of claim 14 wherein each of said fusible links are located between said actuators and said facesheet.

16. The cooled deformable mirror of claim 15 wherein the fusible link for each of said actuators having a coolant passage has a channel aligned with said coolant passage in said actuator to permit coolant to pass between the coolant passage in said actuator and the enclosed chamber in said facesheet.

17. The cooled deformable mirror of claim 16 wherein each of said actuators is fastened to said base by a threaded insert.

18. The cooled deformable mirror of claim 16 wherein said fusible link contains an electrically-operated heating element for selectively disconnecting said actuator from said facesheet.

19. The cooled deformable mirror of claim 19 wherein said electrically-operated heating element on each fusible link may be individually operated to disconnect selected ones of said actuators from said facesheet.

* * * * *